United States Patent [19]
Anderson

[11] 3,873,167
[45] Mar. 25, 1975

[54] NONMETALLIC BEARING HOUSING
[75] Inventor: Lawrence G. Anderson, Greenhurst, N.Y.
[73] Assignee: TRW Inc., Cleveland, Ohio
[22] Filed: July 6, 1971
[21] Appl. No.: 159,724

[52] U.S. Cl. ................................................ 308/74
[51] Int. Cl. .......................................... F16c 13/00
[58] Field of Search .......... 308/26, 184, 74, 72, 15; 248/9, 22, 350

[56] References Cited
UNITED STATES PATENTS

| | | | |
|---|---|---|---|
| 1,160,821 | 11/1915 | Beane | 308/74 |
| 2,211,295 | 8/1940 | Searles et al. | 308/184 R |
| 2,467,994 | 4/1949 | Ruist | 308/189 R |
| 2,469,483 | 5/1949 | Strong | 308/184 R |
| 2,746,429 | 5/1956 | Vann | 308/74 |
| 2,771,326 | 11/1956 | Smith et al. | 308/184 R |
| 3,428,372 | 2/1969 | Keller et al. | 308/184 R |
| 3,472,567 | 10/1969 | Johnson | 308/201 |
| 3,586,403 | 6/1971 | Cooley | 308/184 R |
| 3,724,917 | 4/1973 | Pakulak | 308/72 |

FOREIGN PATENTS OR APPLICATIONS

| | | | |
|---|---|---|---|
| 25,874 | 12/1908 | United Kingdom | 308/74 |
| 217,362 | 6/1924 | United Kingdom | 308/74 |

Primary Examiner—Charles J. Myhre
Assistant Examiner—R. H. Lazarus
Attorney, Agent, or Firm—Hill, Gross, Simpson, Van Santen, Steadman, Chiara & Simpson

[57]   ABSTRACT

A housing for an anti-friction bearing includes a two-part assembly with each of the parts being composed of a nonmetallic material having some flexibility and a high strength to weight ratio. The parts are configured in a manner to utilize the attachment bolts, which secure the housing to a supporting surface, for clamping the separate parts in firm assembly.

3 Claims, 8 Drawing Figures

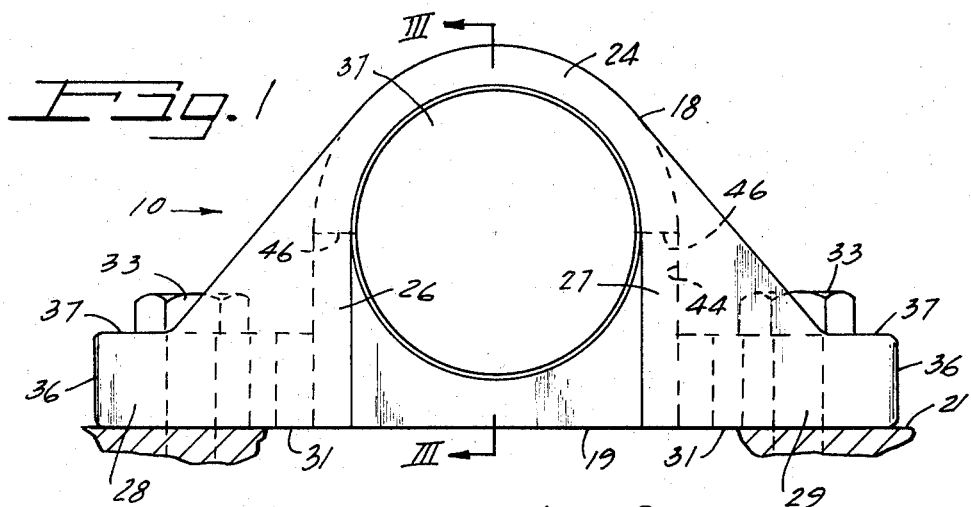
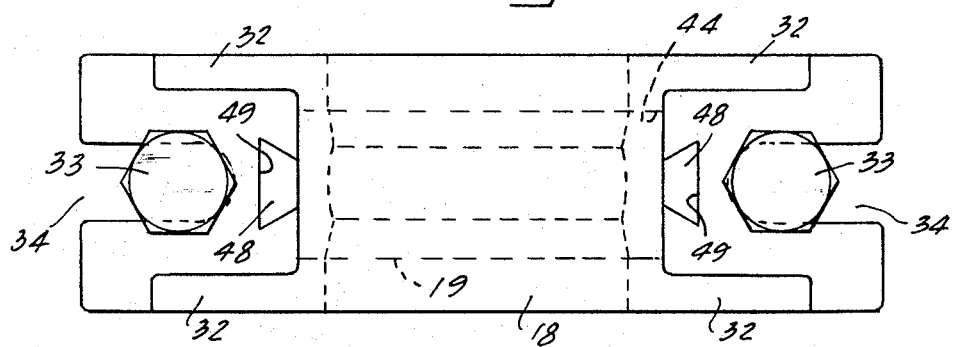
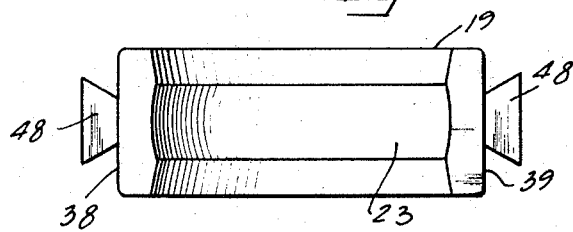
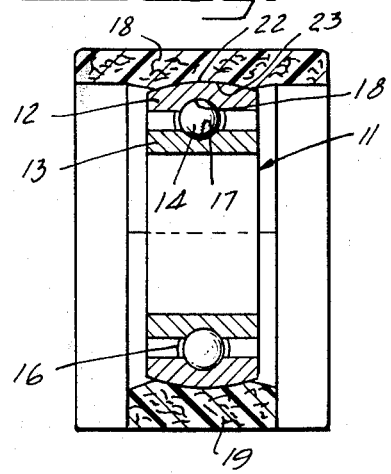
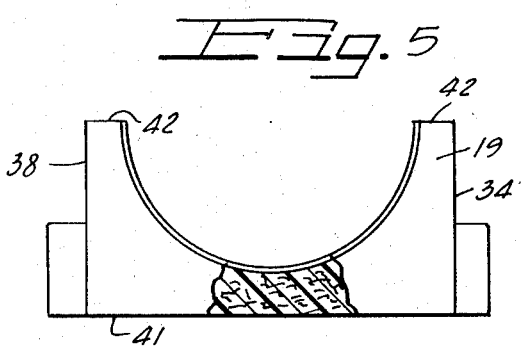
INVENTOR.
Lawrence G. Anderson

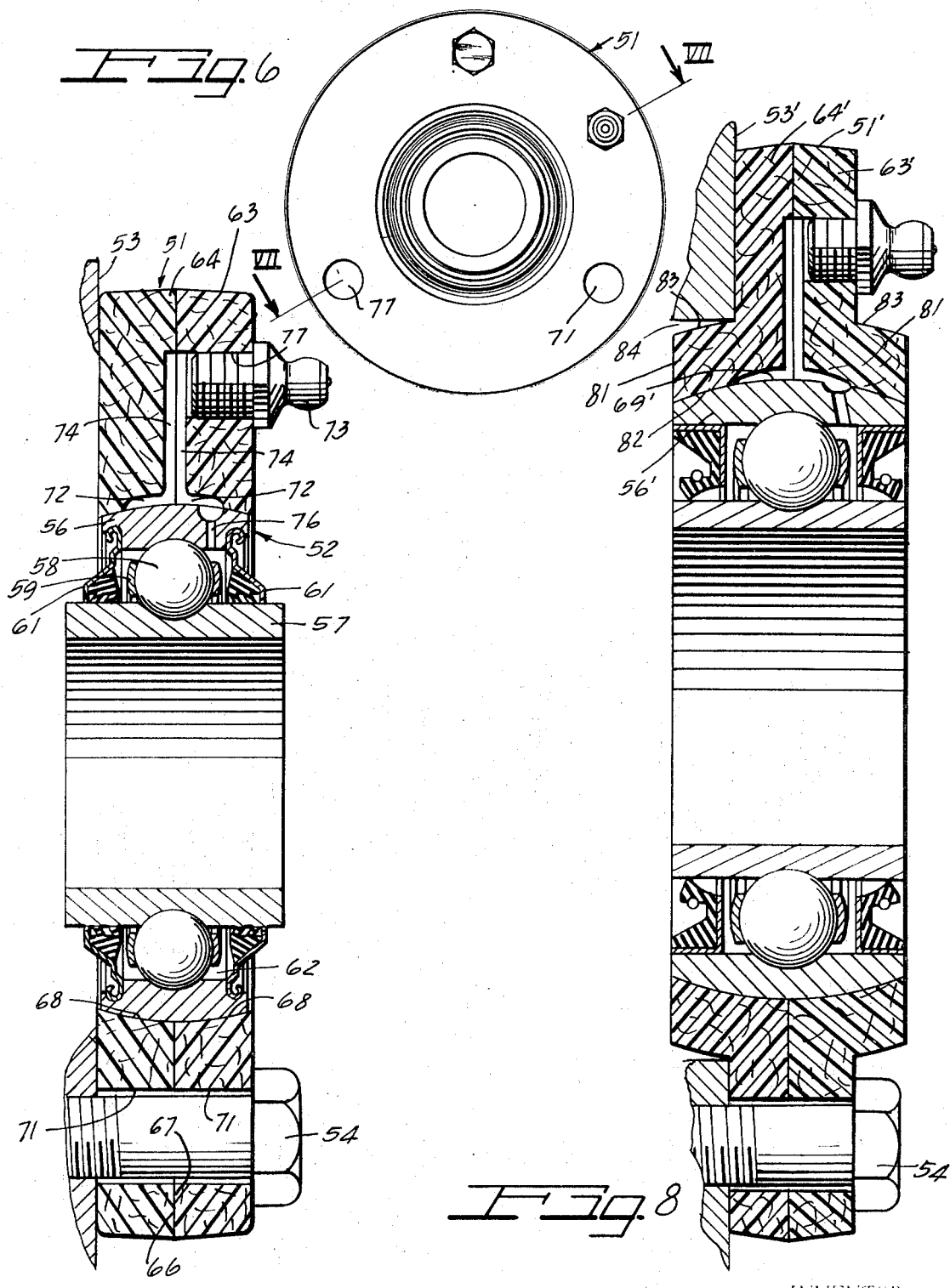

NONMETALLIC BEARING HOUSING

BACKGROUND OF THE INVENTION

1. Field of the Invention

The present invention generally relates to housings for anti-friction ball and roller bearings.

2. Description of the Prior Art

Anti-friction bearings generally comprise an outer bearing ring, an inner bearing ring, an annular arrangement of circumferentially spaced ball or roller elements between the rings and retained in spaced apart relationship by a retainer. To accommodate shaft misalignments, the bearing outer ring may be formed with an outer, convex, parti-spherical surface for mating engagement with an inner concave, parti-spherical surface on a housing which mounts the bearing to a support surface.

Heretofore, the bearing housing has generally included a metallic casting or stamping. Due to the stiffness of the metallic material and its inability to conform to irregularities of the mounting surface or of the bearing outer ring, the prior art metallic housings are not adapted to some applications. One such application is a bearing housing for all terrain vehicles, which may be operated partially submerged in water. Housings for that application and other applications should have some degree of flexibility to absorb shock loadings and for conforming to irregularities in surfaces due to manufacturing tolerances. In addition, it is important that the bearing housings for many applications be low in cost. In general, the prior art housings, of which I am aware, have not successfully combined all of those factors advantageously.

SUMMARY OF THE INVENTION

A housing, constructed in accordance with the present invention, for an anti-friction, ball or roller bearing comprises a two part assembly with each of the parts being composed of a nonmetallic material which has some degree of flexibility and a high strength to weight ratio. One example of such a material is nylon with a glass fiber reinforcement material, with the reinforcement fiber or filament either wound in the configuration of the housing part or randomly dispersed throughout the part in long or short pieces. It is also contemplated by the present invention to mold the housing parts out of nylon or an equivalent synthetic with or without the reinforcement fibers.

The separate parts are adhesively bonded or otherwise joined together and cooperate to form a cavity in which the outer ring of an anti-friction bearing unit may be mounted. In addition to being bonded together, the separate parts are configured so that the bolts for attaching the housing to a supporting surface also clamp the housing parts together in firm assembly. In that manner, the assembled unit does not rely solely upon the bonding between the separate parts to prevent separation thereof during usage. Further, by forming the housing of two separate parts, the mounting of the bearing outer ring in the housing is facilitated, thereby providing an economical assembly operation.

While the invention will be described in detail in reference to a pillow block housing in which the bearing is supported set out from a planar mounting surface by means of feet on the pillow block and in reference to a bulk-head mounted housing unit in which the bearing is mounted by pads abutting a plane basically perpendicular to the center line of rotation of the bearing, other configurations of bearing housings may be formed in accordance with the principles of the present invention.

Accordingly, it is an object of the present invention to provide a nonmetallic bearing housing composed of a material having a degree of flexibility and a high strength to weight ratio.

Another feature of the invention includes the provision of a two-part bearing housing, wherein the housing parts are composed of a non-metallic material and configured to utilize the mounting bolts for assisting in securing the parts in firm assembly.

Other and further objects of this invention will become apparent to those skilled in the art from the following detailed description of certain preferred embodiments of the present invention.

BRIEF DESCRIPTION OF THE DRAWINGS

FIG. 1 is an elevational view of a pillow block bearing housing constructed in accordance with the principles of the present invention;

FIG. 2 is a top plan view of the bearing housing shown in FIG. 1;

FIG. 3 is a sectional view taken substantially along line III—III of FIG. 1 and illustrates a roller bearing, in cross section, mounted in the housing;

FIG. 4 is a top plan view of one of two parts of the bearing housing illustrated in FIGS. 1 through 3;

FIG. 5 is an elevational view, partially cut away, of the housing part shown in FIG. 4;

FIG. 6 illustrates another form of the present invention and is an elevational view of a bulk head or flange mounted bearing housing embodying the features of the present invention;

FIG. 7 is a sectional view taken substantially along lines VII—VII of FIG. 6; and FIG. 8 is a cross sectional view similar to FIG. 7 and illustrates still another form of the present invention.

DETAILED DESCRIPTION OF CERTAIN PREFERRED EMBODIMENTS

Referring to the drawings, and first particularly referring to FIGS. 1 through 5, inclusive, a pillow block bearing housing 10, constructed in accordance with the principles of the present invention, mounts an anti-friction bearing unit 11. As illustrated, the bearing unit is a ball bearing including an outer bearing ring 12, an inner bearing ring 13, an annular arrangement of circumferentially equally spaced ball elements 14 between the inner and outer rings, and a cage or retainer 16 for holding the ball elements in a spaced apart relationship. The inner and outer ring have opposed, spaced apart grooves or raceways 17 and 18, respectively, for receiving the ball elements 14 in rolling engagement. While the bearing unit illustrated in the drawings is a ball bearing unit, other types of bearing units, such as cylindrical, tapered or spherical roller bearing units may be utilized with the housing of the present invention.

In accordance with the principles of the present invention, the housing 10 is a two part assembly, with each of the parts being composed of a nonmetallic material having some degree of flexibility and a high strength to weight ratio. In a commercial example of the present invention, the material is a glass filled nylon with the glass filling including a random arrangement of short glass fibers for reinforcing the housing parts. Other materials may be utilized depending upon the characteristics required by a given application of the housing 10. Further, the reinforcement material may be wound from a continuous filament or series of filaments into the general configuration of the housing parts with the filaments being fused together or bonded with an appropriate bonding agent or filler. Examples of materials which are suitable for bearing applications are described in detail in U.S. Pat. No. 3,472,567, issued to J. H. Johnson on Oct. 14, 1969 and commonly assigned with this application.

As illustrated in FIGS. 1 through 5, inclusive, the housing is of the pillow block type with the two housing parts 18 and 19 cooperating to form a cavity for mounting the bearing unit 11 with an axis thereof disposed substantially parallel to and spaced from a planar supporting surface 21 on which the housing 10 is supported. In order to accommodate misalignment of the bearing unit 11, the bearing outer ring 12 has an outer, convex, parti-spherical surface 22 in mating engagement with a complemental, inner, concave parti-spherical surface 23 formed by the housing parts 18 and 19, thereby to enable limited universal movement of the bearing unit in the housing 10.

The first housing part or body portion 18 has a generally inverted U-shaped configuration characterized by an arcuate bight portion 24 and depending leg portions 26 and 27. Attachment feet 28 and 29 extend outwardly of the depending legs 26 and 27, respectively, to form pads for securing the housing 10 to the supporting surface 21. Each of the attachment feet or pads 28 and 29 has a lower, substantially planar surface 31 abutting the supporting surface 21. A pair of ribs 32, 32 on either side of the housing body portion 18 brace the attachment feet 28 and 29 for enhancing the rigidity of the housing 10. The housing may be secured to the supporting surface 21 by a pair of bolts 33, 33, which pass through slots 34 formed in each of the attachment feet 28 and 29 and opening at an outer edge 36 thereof. The heads of the bolts abut an upper surface 37 on each of the attachment feet and clamp the planar bottom surface 31 to the supporting surface 21. The flexibility of the housing material permits the feet to conform substantially to any slight irregularities which may be present in the supporting surface.

It is contemplated by the present invention to form the second part or housing insert 19 with a configuration selected so that the insert is clamped between the supporting surface and the other housing part 18 whenever the housing 10 is securely clamped to the supporting surface 21 by the bolts 33 or other suitable fastening means. Additionally, the parts are secured together by an appropriate adhesive bonding material, and the bolts 33, therefore, assist the bonding material in maintaining the housing parts 18 and 19 in firm assembly during usage so that the bearing unit 11 is properly clamped and mounted in place.

The second housing part or insert 19 comprises a slab member having a parti-circular cut out forming a concave arcuate surface which cooperates with an inner arcuate surface on the bight portion 24 of the housing body 18 to complete a cavity 37 in which the bearing unit 11 is mounted. The slab insert has a pair of parallel, spaced apart sidewalls 38 and 39, a bottom wall 41 extending perpendicularly between the sidewalls and a discontinuous top wall 42 on either side of the parti-circular cut out. Each of the leg portions 26 and 27 of the housing body 18 has a recess 44 into which opposite side edge portions of the insert area received with the top wall portions 42 on the insert abutted against inner ends 46 of the recess. The recesses 44 formed in the housing body open at a lower edge thereof so that the insert 19 may be slipped into position. The spacing between the bottom surface 31 and the inner ends 46 of the recesses 44 and the height of the insert 19 are selected so that the housing body clamps the insert to the support surface whenever the housing 10 is properly mounted by the bolts 33.

In order to assure proper alignment of the insert 19 in the housing body 18, the insert has a pair of oppositely projecting, dove tail shaped ears 48, 48 projecting from the sidewalls 38 and 39. The dove tail shaped ears are fittingly received in complemental recesses 49 formed in the attachment feet 28 and 29 and opening into the recesses 44.

Referring now to FIGS. 6 and 7, wherein the principles of the present invention are illustrated as applied to a flange mounted bearing housing 51, the housing 51 supports a bearing unit 52 with an axis thereof substantially perpendicular to a planar surface 53 on which the housing is secured by means of bolts 54. The bearing unit 52 is substantially similar to the bearing unit 11 described hereinabove and comprises an outer ring 56, an inner ring 57, a plurality of annularly arranged balls 58 held in a circumferentially equally spaced relationship by an appropriate retainer 59. The bearing unit 52 also includes a pair of grease seals 61, 61 closing opposite sides of an annular opening 62 between the outer ring 56 and the inner ring 57 for retaining an appropriate lubricant, such as grease, in the bearing unit.

Similar to the first embodiment described hereinabove, the housing is a two part assembly, with each of the parts being composed of a non-metallic material having some degree of flexibility and a high strength to weight ratio. As illustrated, the material includes a nylon composition with randomly arranged, short glass fibers interposed therein for reinforcement.

The two housing parts 63 and 64 are substantially identical, and each part includes an annular member. The annular housing part 63 has a face surface 66 in mating engagement with a face surface 67 on the part 64, and each of the parts has an inner, parti-spherical surface 68 sized to cooperate to form a surface complemental to an outer, convex, parti-spherical surface 69 on the bearing outer ring 56. In that manner, the bearing unit 52 is mounted to enable slight misalignment of the bearing axis.

An appropriate bonding material joins the mating face surfaces 66 and 67 of the housing parts. In order to assist the bonding material in holding the part in firm assembly during usage, the parts 63 and 64 have a plurality of circumferentially spaced bolt holes or apertures 71 formed therein with the bolt holes of one part disposed in alignment with those of the other part. The mounting bolts 54 pass through the aligned apertures of bolt holes 71 and clamp the housing parts 63 and 64 together and to the supporting surface 53.

To enable replenishing any lubricant which may seep through the grease seals 61, each of the housing parts 63 and 64 has a recess 72 formed in the parti-spherical surface 68 and communicating with the grease fitting 73 via a groove 74 disposed in the mating surfaces 66 and 67. A radial aperture 76 formed in the bearing outer ring 56 communicates the annular lubricant space 62 with the recesses 72. The housing part 63 differs from the housing part 64 in that it has a threaded aperture 77 intersecting the groove 74 and threadingly receiving the grease fitting 73.

Referring now to FIG. 8, a still further embodiment of the present invention contemplates forming a flange mounted bearing housing 51' with pilot portions formed thereon and received in an opening in the supporting surface 53'. In other respects, the housing 51', as illustrated in FIG. 8, is substantially identical to that illustrated in FIGS. 6 and 7 and described hereinabove, and thus, like elements are identified by like reference numerals to which a prime has been added.

As illustrated in FIG. 8, each of the separate housing parts 63' and 64' has an annular, axially offset flange 81 having an internal, concave, parti-spherical surface 82 formed thereon and sized complementally to the parti-spherical surface 69' on the bearing outer ring 56'. A radially outward surface 83 on each of the annular flanges 81 has a substantially conical configuration, thereby providing a tapered pilot to assist in centering the bearing housing 53' in an opening 84. With the embodiment of the present invention, as illustrated in FIG. 8, the housing 51' may accommodate a bearing unit having a wider outer ring than that possible with the configuration illustrated in FIGS. 6 and 7, with similarly dimensioned annular flanges through which the bolts pass.

Although those versed in the art may suggest various minor modifications, it should be understood that I wish to embody within the patent warranted hereon all such modifications as reasonably and properly come within the scope of my contribution to the art.

I claim as my invention:

1. A glass fiber reinforced nylon pillow block adapted to tiltably support an anti-friction bearing with a convex outer race ring which comprises a glass fiber reinforced nylon inverted U-shaped body having an open bottom semi-cylindrical bight portion with depending side legs and outturned apertured feet at the bottoms of said side legs, said bight portion having bottom ends providing abutment shoulders at the tops of said legs, said legs having recesses along the length thereof, said feet having central dove-tail recesses diverging from the bottoms of said leg recesses, a glass fiber reinforced nylon slab having an open top semi-cylindrical recess with end walls for abutting said abutment shoulders of said body, side walls fitting the leg recesses of the body and a bottom with laterally projecting dove-tail ears fitting the dove-tail grooves of the feet of said body, said open bottom semi-cylindrical bight portion of the body and said open top semi-cylindrical recesses of the slab having transversely concave inner peripheral surfaces, and bolts bottomed in said apertured feet for securing the pillow block to a base and bottoming the shoulders of the body against the top end walls of the slab to unite the body and slab in fixed relation with the dove-tail ears of the slab mating in the diverging recesses of the body to secure the slab against lateral displacement relative to the body, and said concave inner peripheries of the semi-cylindrical portions of the slab and the bight portion of the body forming a continuous concave annular seat to tiltably support the convex outer race ring of the anti-friction bearing in the pillow block.

2. The pillow block of claim 1 including ribs extending from opposite sides of the bight portion and legs and the outturned feet of the body in integral relation therewith to brace the feet and enhance the rigidity of the body.

3. The pillow block of claim 1 wherein the apertured feet have central slots open at the outer ends of the feet receiving the bolts and accommodating longitudinal shifting of the pillow block relative to a support.

* * * * *